United States Patent
Karas et al.

[15] 3,655,405
[45] Apr. 11, 1972

[54] SOUFFLE MIX

[72] Inventors: Albert J. Karas; John E. Vey, both of Baltimore, Md.

[73] Assignee: McCormick & Company, Inc., Cockeysville, Md.

[22] Filed: Jan. 8, 1970

[21] Appl. No.: 1,562

[52] U.S. Cl. ..................................99/94, 99/139, 99/92
[51] Int. Cl. ..................................A21d 2/02, A21d 2/18
[58] Field of Search ..............................99/139, 94

[56] References Cited

UNITED STATES PATENTS

| | | | |
|---|---|---|---|
| 3,043,700 | 7/1962 | Szczesniak | 99/94 |
| 3,333,965 | 8/1967 | Kurtzhalts | 99/94 |
| 2,939,792 | 6/1960 | Kline | 99/94 |
| 3,287,139 | 11/1966 | Ganz | 99/94 |

*Primary Examiner*—Raymond N. Jones
*Assistant Examiner*—J. M. Hunter
*Attorney*—Cushman, Darby & Cushman

[57] ABSTRACT

A dry, essentially fat-free souffle composition is packaged in two containers. One package contains a dry sauce mix which is a blend of regular starch, pregelatinized starch, whey solids, a sweetening agent and a confectionery flavoring agent. The second package contains a dry albumen mix which is a blend of egg white solids, a leavening agent, a stabilizing agent and a sweetening agent. Water is separately added to the dry mixes and the resulting wet mixes are folded together and baked to produce a high quality souffle.

4 Claims, No Drawings

SOUFFLE MIX

This invention relates to a dry-mix food composition and more particularly to a two-package dry-mix composition from which souffles can be produced.

The preparation of souffles has long been considered a time-consuming and complicated operation with no real assurance that the resulting souffle would be satisfactory or, even if satisfactory, that the result could be easily duplicated. One factor which accounts for the tediousness of preparing a souffle in accordance with conventional procedures is the need for exact measurement of the relative amounts of the ingredients to control the height the souffle achieves during baking, the texture of the resulting souffle and the degree of stability the finished souffle exhibits. Minor measurement miscalculations generally result in an unsatisfactory souffle which represents a loss in time, effort and money expended for the ingredients.

It has now been found that the difficulties attendant with the conventional preparation of souffles can be overcome by the present invention which comprises a two-package dry-mix composition, which, after mixture of water therewith and baking, provides a finished souffle exhibiting highly favorable height, texture and stability characteristics.

Accordingly, it is an object of this invention to provide a two-package dry-mix composition which is suitable for the preparation of a souffle and which simplifies the preparation of the same. Another object of the present invention is to provide a two-package, essentially fat-free dry-mix composition for souffles which makes possible the production of souffles exhibiting highly desirable and easily reproducible texture, stability and height characteristics, and wherein the ingredients of the composition are present in the necessary amounts relative to each other to assure the achievement of such characteristics, thereby eliminating essentially the need of time consuming measuring operations heretofore required of the baker. It is a further object of the present invention to provide a dry-mix composition characterized by a novel combination of ingredients which improves the texture and stability characteristics of the finished souffle.

The two-package, essentially fat-free composition of this invention comprises a first package containing a dry sauce mix and a second package containing a dry albumen mix.

The dry sauce mix comprises a blend of regular starch, pregelatinized starch, whey solids and a flavoring agent. The dry albumen mix comprises a blend of egg white solids, a leavening agent and a stabilizing agent.

The dry-mix composition of this invention is suitable for both confectionery and non-confectionery flavored souffles and when a confectionery flavored souffle is desired, both the dry sauce mix and the dry albumen mix will also contain a sweetening agent.

In the dry sauce mix, the regular starch employed can be corn starch (waxy maize starch), wheat starch, wheat flour, arrowroot starch or the like, although waxy maize starch is preferred. The amount of regular starch employed ranges between 13.5–17.5 weight percent of the dry sauce mix, 15 weight percent being preferred.

The pregelatinized starch utilized in the dry sauce mix can be any of those commercially available such as pregelatinized starches of tapioca, corn, potato, arrowroot and sago, although pregelatinized tapioca starch is preferred. The amount of pregelatinized starch employed ranges between 13.5–17.5 weight percent of the dry sauce mix, 15 weight percent being preferred. Further, improved texture characteristics are achieved by the present invention by the use of a combination of regular and pregelatinized starches and especially by the use of the preferred types of these starches, i.e. waxy maize starch and pregelatinized tapioca starch.

Whey solids, a water-dispersible by-product in the manufacture of cheeses contains about 66 percent carbohydrates and 16–17 percent protein. A typical analysis of dried whey reveals that it contains about 70 percent lactose, 12.5 percent protein, 7–11 percent ash, 0.5 to 3.5 percent fat and up to about 3 percent moisture. The whey solids are present in the dry sauce mix in amounts ranging between about 31–45 weight percent, preferably about 41 weight percent based on the total weight of the dry sauce mix.

The flavoring agent used in the dry sauce mix can vary depending on the type of souffle desired. Thus, if a confectionery type souffle is desired, a confectionery flavoring ingredient in dry form such as chocolate, cocoa, vanilla, lemon, orange, cherry, coffee, walnut, apple, pineapple or dehydrated fruits can be employed. When a confectionery flavored souffle is desired, the dry sauce mix contains a sweetening agent in amounts ranging from 10 to 30 weight percent and preferably 20 weight percent based on the total weight of the dry mix. The amount of flavoring ingredient, of course, can vary depending on the intensity of flavor desired by the consumer. The sweetening agent, preferably, is sucrose, although it will be recognized that other commercially available sweetening agents can be employed such as fructose, dextrose, a mixture of sucrose and dextrose with saccharin or any combination of the above ingredients, along or in admixture with conventional artificial sweetening agents.

The dry sauce mix, if desired, can also contain other ingredients such as food colorants, natural or synthetic, other conventional flavor materials such as salt and a leavening agent such as baking powder in an amount of about 1–2.5 weight percent, although other leavening agents in comparable amounts can be employed.

When a non-confectionry souffle is desired the principal flavoring ingredient can be dehydrated vegetables such as spinach, green pepper, onion, carrot, squash, or meat such as poultry, or cheese such as Swiss, cheddar, American or the like. In non-confectionery souffle compositions, the sweetening agent is generally omitted.

In the dry albumen mix, the egg white solids are present in amounts ranging between 10–15 and preferably about 13 weight percent based on the total weight of the albumen mix.

The leavening agent employed in the dry albumen mix is, preferably, cram of tartar which is present in amounts ranging from about 0.35 to 0.70 weight percent and preferably about 0.5 weight percent, based on the total weight of the dry albumen mix.

The stabilizing agent in the dry albumen mix is employed in amounts ranging from about 1.25 to 1.75 weight percent, preferably about 1.5 weight percent based on the total weight of the albumen mix. The presence of the stabilizing agent provides excellent protection against the collapse or "weeping" of moisture from the finished souffle. Preferably, the stabilizing agent is guar gum, although other gums, such as algin derivatives can also be used.

When a confectionery type souffle is desired the sweetening agent present in the albumen mix is granular sugar and is employed in amounts ranging from about 75–90 and preferably about 85, weight percent based on the total weight of the dry albumen mix. The weight ratio of dry sauce mix to dry albumen mix, for a confectionery type souffle, is 1.04:1.

The dry sauce mix of this invention is preferably compounded in commercially available stainless steel blenders by adding initially all the dry ingredients except the regular starch and whey solids and blending the same for about 10 minutes. Thereafter the regular starch and whey solids are added to the mixing apparatus and the blending is continued for about 8 minutes or until an essentially uniform appearing dry-mix is obtained. The dry sauce mix is separately packaged in a suitable container which can be merchandized as a unit with a similar container in which is packaged the dry albumen mix.

In preparing the dry albumen mix, the dry ingredients except the egg white solids are blended in a similar conventional mixing apparatus for a period of about 5 minutes, after which the egg white solids are added the the blending operation continued for a period of about 10 minutes. Obviously, the blending time in each case can be varied and will depend upon the total weight of each batch of ingredients, the times disclosed above being based on 100 pound portions of each of the dry sauce and albumen mixes. Ordinarily the ingredients are blended in an environment controlled at a relative humidity of about 55 percent or less and at a temperature of 60° F. or above. The dry sauce mix conveniently can be packaged in a 2⅝ ounce portion and merchandised as a unit with a dry albumen mix packaged in a 2½ ounce portion, thereby providing the suitable relative amounts of each dry-mix to provide a finished souffle exhibiting highly favorable texture, stability and height characteristics.

To prepare a souffle from the two-package dry-mix composition of this invention, there is added to a 2½ ounce portion of the dry albumen mix one-half cup of water at room temperature i.e. about 72° F. and the mixture is whipped or beaten until stiff peaks are formed, ordinarily about 3 minutes using a rotary beater. To a 2⅝ portion of the dry sauce mix there is added three-fourths cup of water, also at room temperature, the ingredients are beaten until a substantially uniform or homogeneous mixture is obtained, generally in about 3 minutes.

The wet sauce mix is then gently folded into the wet albumen mix using a rubber spatula for about 1 minute. After folding, the total mixture is introduced into an appropriate baking dish or dishes, which in turn are placed into a shallow pan containing about three-fourths inch water. The souffle mix filled baking dish housed in the shallow pan is then placed in an oven preheated to 350° F. and baked for 1 hour. The resulting souffle exhibits excellent texture, stability and height characteristics.

Obviously, however, the individual packages containing the dry sauce mix and dry albumen mix can be merchandized in amounts other than 2⅝ ounce and 2½ ounce portions, respectively, while maintaining the relative amounts one to the other.

The following examples further illustrate the present invention:

EXAMPLE I

2⅝ ounces of dry sauce mix were prepared by adding the below listed ingredients (1) through (6) in the following weight percentages of the total, in a stainless steel blender and mixed for a period of 10 minutes. Thereafter ingredients (7) and (8) were added and the blending continued for 8 minutes.

| Ingredient | Weight percent |
| --- | --- |
| (1) Sugar, coating | 25.00 |
| (2) Salt, fine flake | 0.50 |
| (3) Cocoa, powdered | 10.00 |
| (4) Chocolate flavor | 1.00 |
| (5) Baking powder | 2.0 |
| (6) Pregelatinized tapioca starch | 15.00 |
| (7) Waxy maize starch | 15.00 |
| (8) Whey solids | 31.50 |

2½ ounces of dry albumen mix were prepared by adding the below listed ingredients (1) to (3) in the following weight percentages of the total in a stainless steel blender and mixed for a period 5 minutes. Thereafter ingredient (4) of added and the blending was continued for 10 minutes.

| Ingredient | Weight percent |
| --- | --- |
| (1) Sugar, coating | 85.0 |
| (2) Guar Gum | 1.5 |
| (3) Cream of tartar | 0.5 |
| (4) Egg white solids | 13.0 |

To the dry albumen mix there was added one-half cup of water in a 1½ to 2 quart non-plastic mixing bowl. The mixture was beaten with an electric mixer set at medium speed until stiff peaks formed.

To the dry sauce mix there was added three-fourths cup of water in a small mixing bowl. The mixture was beaten for 3 minutes at medium speed.

The wet sauce mix was gently folded into the wet albumen mix for one minute using a rubber spatula. The resulting mixture was placed into a baking mold which, in turn, was placed in a shallow pan to which was added water to a depth of about three-fourths inch. The assembly of the mold and pan was then placed in an oven preheated to 350° F. and baked for 1 hour. The resulting chocolate souffle exhibited highly acceptable flavor, texture, stability and height characteristics.

EXAMPLE II

2⅝ ounces of a dry vanilla sauce mix were prepared by mixing the below listed ingredients (1) through (8) in the manner outlined in Example I. Thereafter, ingredients (9) and (10) were added and the blending was continued for 8 minutes.

| Ingredient | Weight percent |
| --- | --- |
| (1) Sugar, coating | 15.00 |
| (2) Salt, fine flake | 0.50 |
| (3) Dextrose | 9.0 |
| (4) Imitation Vanilla | 0.20 |
| (5) Vanilla powder | 2.0 |
| (6) Food color, yellow | 0.006 |
| (7) Baking powder | 2.0 |
| (8) Pregelatinized tapioca starch | 15.00 |
| (9) Waxy maize starch | 15.00 |
| (10) Whey solids | 41.294 |

2½ ounces of dry albumen mix were prepared essentially as outlined in Example I and both the dry vanilla mix and dry albumen mix were processed, also in the manner outlined in Example I, to produce a vanilla souffle which also exhibited highly acceptable taste, texture, stability and height characteristics.

EXAMPLE III

2⅝ ounces of a dry lemon sauce mix were prepared by mixing the below listed ingredients (1) through (7) in a fashion similar to that set forth in Example I. Subsequently, ingredients (8) and (9) were added and the mixing operation was continued for 8 minutes.

| Ingredient | Weight percent |
| --- | --- |
| (1) Sugar, coating | 25.00 |
| (2) Salt, fine flake | 0.50 |
| (3) Lemon Flavor | 2.00 |
| (4) Food color, yellow | 0.005 |
| (5) Lemon Flavor, imitation | 0.5 |
| (6) Citric acid, anhydrous | 1.0 |
| (7) Pregelatinized tapioca starch | 15.00 |
| (8) Waxy maize starch | 15.00 |
| (9) Whey solids | 40.995 |

2½ ounces of dry albumen mix were prepared essentially as outlined in Example I. Water was added to both the dry lemon sauce mix and the dry albumen mix also as set forth above in Example I and the resulting wet mixes were folded together and baked in the manner indicated heretofore. The resulting finished lemon souffle exhibited highly acceptable taste, texture, stability and height characteristics.

What is claimed is:

1. A two package dry, essentially fat-free souffle composition which comprises a first package containing a dry sauce mix comprising a blend of 13.5–17.5 weight percent regular starch, 13.5–17.5 weight percent pregelatinized starch, 31–45 weight percent whey solids, 10 to 30 weight percent sweetening agent, the balance being essentially flavoring material, and a second package containing a dry albumen mix comprising a blend of 10–15 weight percent egg whites, 0.35–0.70 weight percent leavening agent, 1.25–1.75 weight percent stabilizing agent and 75–90 weight percent sweetening agent.

2. The two package souffle composition of claim 1 wherein the regular starch is waxy maize starch, the pregelatinized starch is pregelatinized tapioca starch, the flavoring material comprises a confectionery flavoring agent, the leavening agent is cream of tartar, the stabilizing agent is guar gum and the sweetening agent is sucrose.

3. The two package souffle composition of claim 1 wherein the dry sauce mix includes 1–2.5 weight percent leavening agent.

4. The two package souffle composition of claim 3 wherein the leavening agent is baking powder.

* * * * *